(12) United States Patent
Chin

(10) Patent No.: US 6,573,619 B2
(45) Date of Patent: Jun. 3, 2003

(54) CONTROLLABLE POWER-ECONOMIZING EXTENSION SOCKETS

(76) Inventor: Yi-Ho Chin, P.O. Box 90, Tainan City, Taiwan (CN)

( * ) Notice: Subject to any disclaimer, the term of this patent is extended or adjusted under 35 U.S.C. 154(b) by 125 days.

(21) Appl. No.: 09/775,606

(22) Filed: Feb. 5, 2001

(65) Prior Publication Data

US 2002/0106910 A1 Aug. 8, 2002

(51) Int. Cl.[7] .............................................. H01H 47/00
(52) U.S. Cl. ........................ 307/125; 307/11; 307/31; 307/38; 307/39; 307/139
(58) Field of Search ............................ 307/11, 31, 139, 307/38, 39

(56) References Cited

U.S. PATENT DOCUMENTS 3,416,001 A * 12/1968 Fistell .......................... 307/38
3,809,927 A * 5/1974 Takagi et al. ................ 307/293
4,078,720 A * 3/1978 Nurnberg .................... 236/46 R
4,659,941 A * 4/1987 Quiros et al. ................. 307/11

\* cited by examiner

*Primary Examiner*—Brian Sircus
*Assistant Examiner*—Robert L. DeBeradinis

(57) ABSTRACT

A controllable power-economizing extension sockets includes a socket body, a main control socket and plural interactive sockets formed properly spaced apart in the socket body, a voltage stabilizer, and a capacitor and an electro-magnetic switch connected between the input terminal of power and the main control socket. The electro-magnetic switch is connected to each of interactive sockets to form a control circuit. The voltage stabilizer supplies a constant voltage to let the electro-magnetic switch operate to let the interactive sockets for peripheral electric or electronic appliances turned on or off synchronously with the main control socket.

1 Claim, 2 Drawing Sheets

CONTROLLABLE POWER-ECONOMIZING EXTENSION SOCKETS

BACKGROUND OF THE INVENTION

1. Field of the Invention

This invention relates to controllable power-economizing extension sockets, particularly to one provided with a simple AC control circuit to turn on or off synchronously all the power sources of peripheral appliances when a main appliance is turned on or off, simple in handling and economizing power as well.

2. Description of the Prior Art

At present most conventional extension sockets are provided with a plurality of sockets for various plugs of electric and electronic appliances to insert to get power. Though they are convenient to use, when plugs are inserted therein with power not yet turned on, a circuit is already formed to continually consume a little current, resulting in waste of power and expenditure. IN addition, electric or electronic appliances having their plugs inserted in the extension sockets may shorten their usable life due to long-term use. So users often pull out the plugs of the electric or electronic appliances or may not pull out owing to the location of the extension sockets, but only turn off the switches of the electric or electronic appliances. Nevertheless, computers are extremely popular now, with many peripheral appliances used at the same time by utilizing extension sockets. However, if a user is too lazy, not turning off all the power for all appliances the person uses, the person wastes power and accordingly its expense.

SUMMARY OF THE INVENTION

The main objective of the invention is to offer a kind of extension sockets, easily controllable in turning on and off switches of power and economizing power as well.

Another objective of the invention is to offer extension sockets of a less cost than conventional ones.

One more objective of the invention is to offer extension sockets applicable to various input voltages.

The man feature of the invention is a voltage stabilizer connected to the input of power and also to a main control socket of the extension sockets. The voltage stabilizer consists of a voltage-stabilizing element and a reverse diode connected in parallel, and a capacitor and an electromagnetic switch connected in parallel to two terminals of the voltage stabilizer. The contact switch of the electro-magnetic switch is connected to each of interactive sockets of the extension sockets. If the switch of a main appliance having its plug inserted in said main control socket is turned on or off, the voltage stabilizer supplies a constant voltage to operate the electro-magnetic switch, turning on or off synchronously all the interactive sockets in which the plugs of peripheral electric or electronic appliances are inserted.

BRIEF DESCRIPTION OF DRAWINGS

This invention will be better understood by referring the accompanying drawings, wherein.

DETAILED DESCRIPTION OF THE PREFERRED EMBODIMENT

Figure 1:
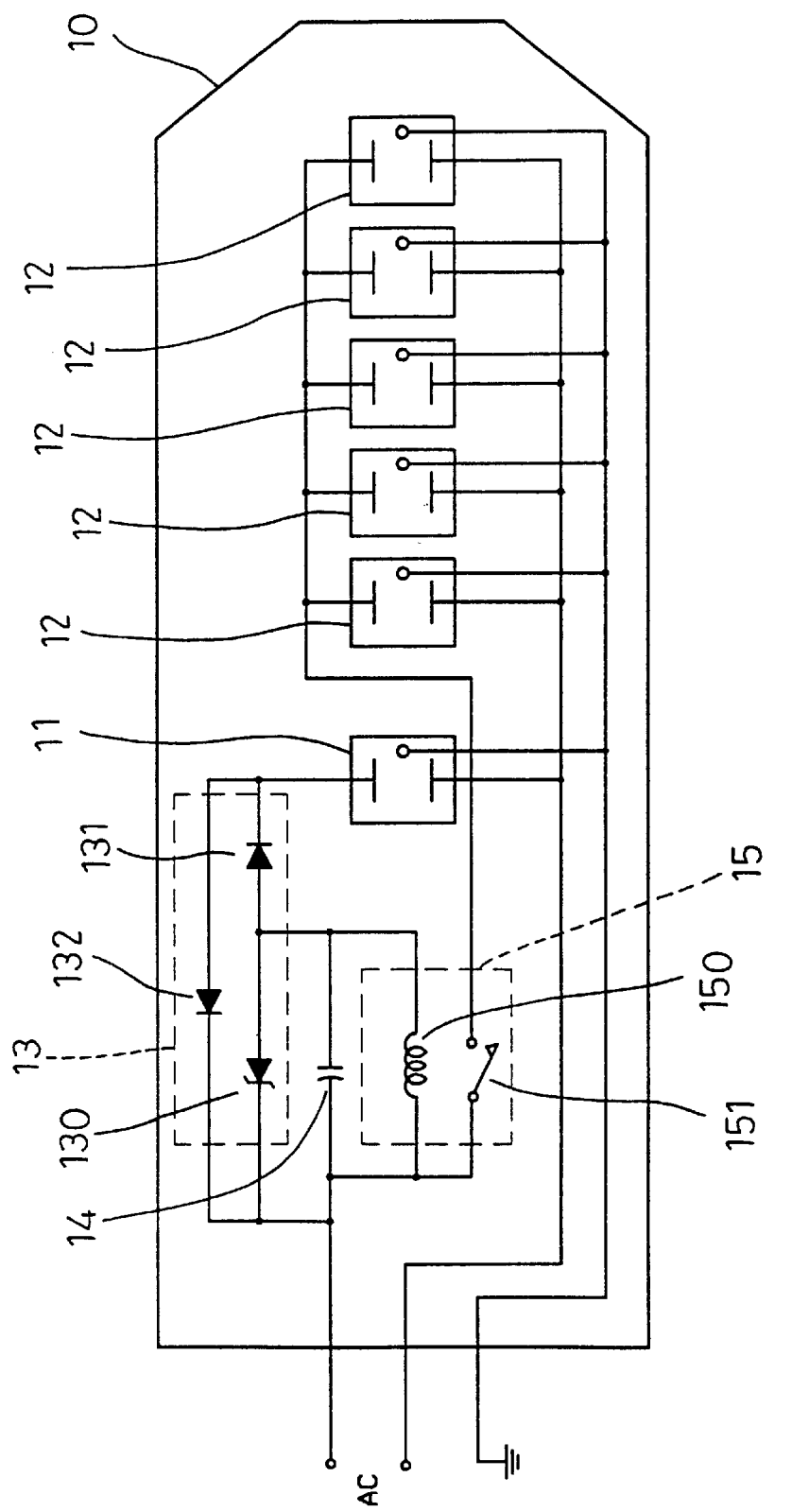
FIG. 1 is a diagram of the circuit of controllable and power-economizing extension sockets in the present invention; and, FIG. 2 is a perspective view of using the controllable power-economizing extension sockets of the invention connected to a computer and its peripheral appliances.

The preferred embodiment of controllable and power-economizing extension sockets in the invention, as shown in FIG. 1, includes a socket body 10, a main control socket 11 and a plurality of interactive sockets 12 formed properly spaced apart on the socket body 10, a voltage stabilizer 13 fixed on the socket body 10 and connected to the main control socket electrically. The voltage stabilizer 13 consists of a voltage stabilizing element 130 and a first diode 131 connected forward between the main control socket 11 and the power input, and a second diode 132 connected reverse between the voltage stabilizing element 130 and the first diode 131. Further, a capacitor 14 and an electro-magnetic switch 15 are respectively connected to two terminals of the voltage stabilizing element 130, having a contact switch 151 connected to a terminal of each of the interactive sockets 12, with the other terminal of each of the interactive sockets 12 connected in parallel to the other terminal of AC power.

Figure 2:
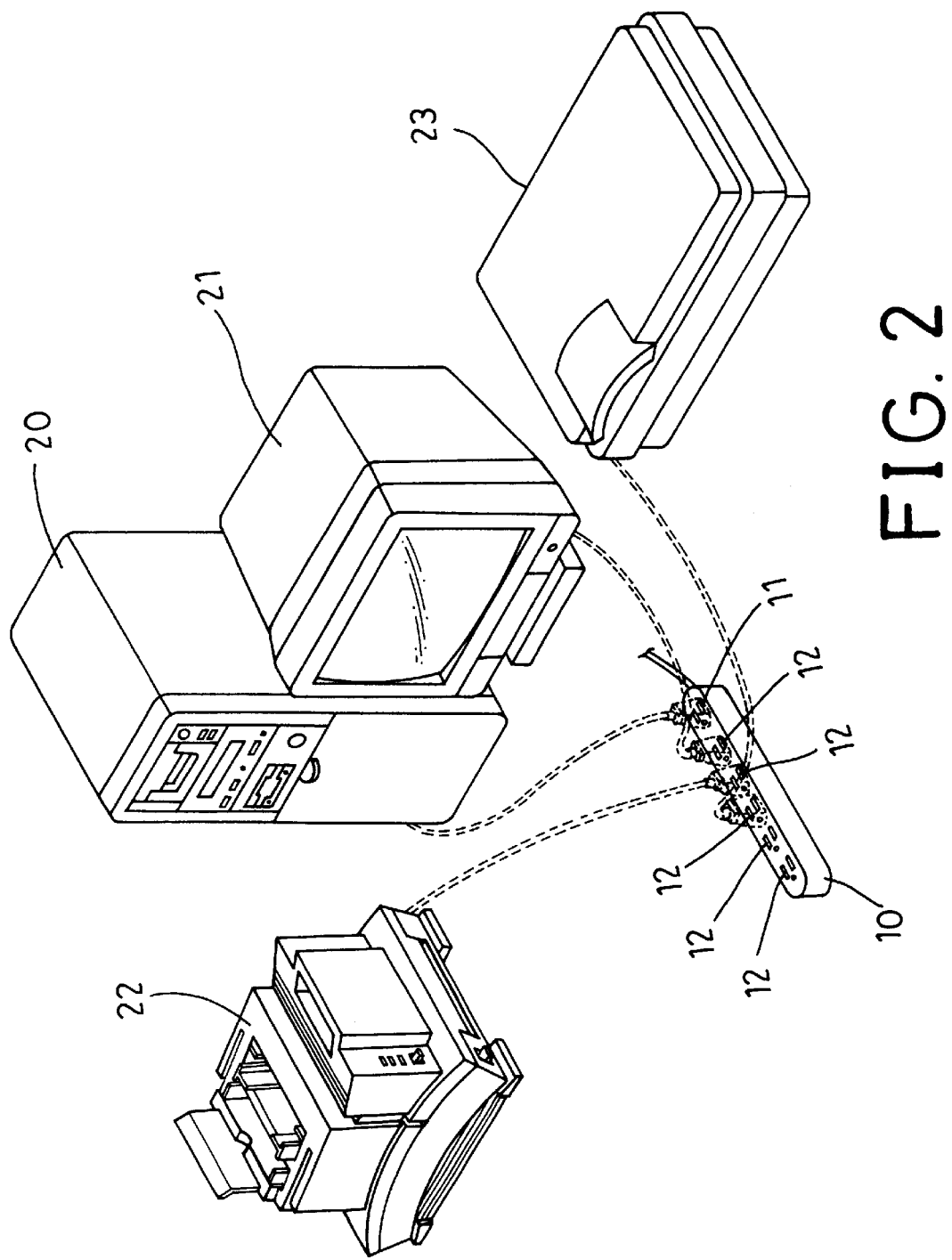

As to using the controllable power-economizing extension sockets in the invention, as shown in FIG. 2, the plug of a computer 20 is inserted in the main control hole 11, and those of a printer 22, a scanner 23, a screen 21, etc. are inserted in the interactive sockets 12. When the switch of the computer 20 is turned on, plus semi-circular current of AC flows through the voltage stabilizing element 130 and the first diode 131 to the main control socket 11. Then the voltage stabilizing element 130 supplies a constant voltage to the capacitor 14, which is charged to store electricity and excite magnetism to a coil 150, producing magnetism by electricity to close the contact switch to let electricity flow through to the sockets 12 for use.

When AC power changes to minus semi-circular current, it flows through the main control socket 11, the computer 20 and the second diode 132 and back to the power terminal, and the first diode 131 can ensure that the electricity stored in the capacity 14 during plus semi-circular current of AC is discharged to the coil 150 during minus semi-circular current so as to continue to excite magnetism of the coil 150, with the contact switch 151 kept in the closed condition. Therefore, plus and minus semi-circular current alternately flow through the main control socket 11 to all the interactive sockets 12 to secure flow of electricity without fail.

In case that the main computer and its peripheral appliances are to be cut off, only turn off the switch of the main computer 20 to cut off power through the main control socket 11, and then the voltage stabilizer 13 cannot supply voltage to the electro-magnetic switch 15, with the coil 150 no longer excited to produce magnetism by electricity, triggering open the contact switch 151 and immediately cutting off electricity to the interactive sockets 12. Thus, turning on or off the switch of the main computer 20 having its plug inserted in the main control socket 11 can turn on or off synchronously all the interactive sockets 12.

The voltage needed for controlling all circuits is supplied by the voltage stabilizer 13, which has the voltage stabilizing element 130 connected to plural diodes in series to acquire a constant voltage reduced, and possible to endure high current, whether it is 110V or 220V. In this way the voltage stabilizer 13 can supply a stabilized constant voltage to the electro-magnetic switch 15, applicable to various voltage in different countries.

Further, the controllable power-economizing extension sockets in the invention also can apply to visual and acoustic equipment, with the most-frequently used appliance having its plug inserted in the main control socket 11, such as main acoustic appliance or TV, and with a CD player, a DVD player, a cassette player, etc. having their plugs inserted in the interactive sockets 12.

What is claimed is:

1. A controllable power-economizing extension sockets comprising:
   a socket body comprising,
      a main control socket and
      a plurality of interactive sockets spaced apart and connected in parallel; each input of each interactive socket being connected to one electrode of an AC source;
   a voltage stabilizer having one terminal connected to said main control socket and another terminal to another electrode of another electrode, said voltage stabilizer consisting of
      a voltage stabilizing element and a reverse diode connected in parallel to each other,
      a capacitor connected to two terminals of said voltage stabilizer in parallel,
      an electro-magnetic switch connected to two terminals of said capacitor and said two parallel terminals in parallel, said electro-magnetic switch having a contact switch connected to an output of each of the interactive sockets,
   wherein said voltage stabilizer supplies a constant voltage to said electro-magnetic switch to operate in case of a main electric or electronic appliance having its plug inserted in said main control socket turned on or off, said interactive sockets synchronously turned on or off with said main control socket,
   wherein said electro-magnetic switch is a relay containing a coil and a switch; and said voltage stabilizing element is a Zener diode.

* * * * *